Mar. 3, 1925. 1,528,697
S. SALLEY
FENDER
Filed Oct. 1, 1924 2 Sheets-Sheet 1
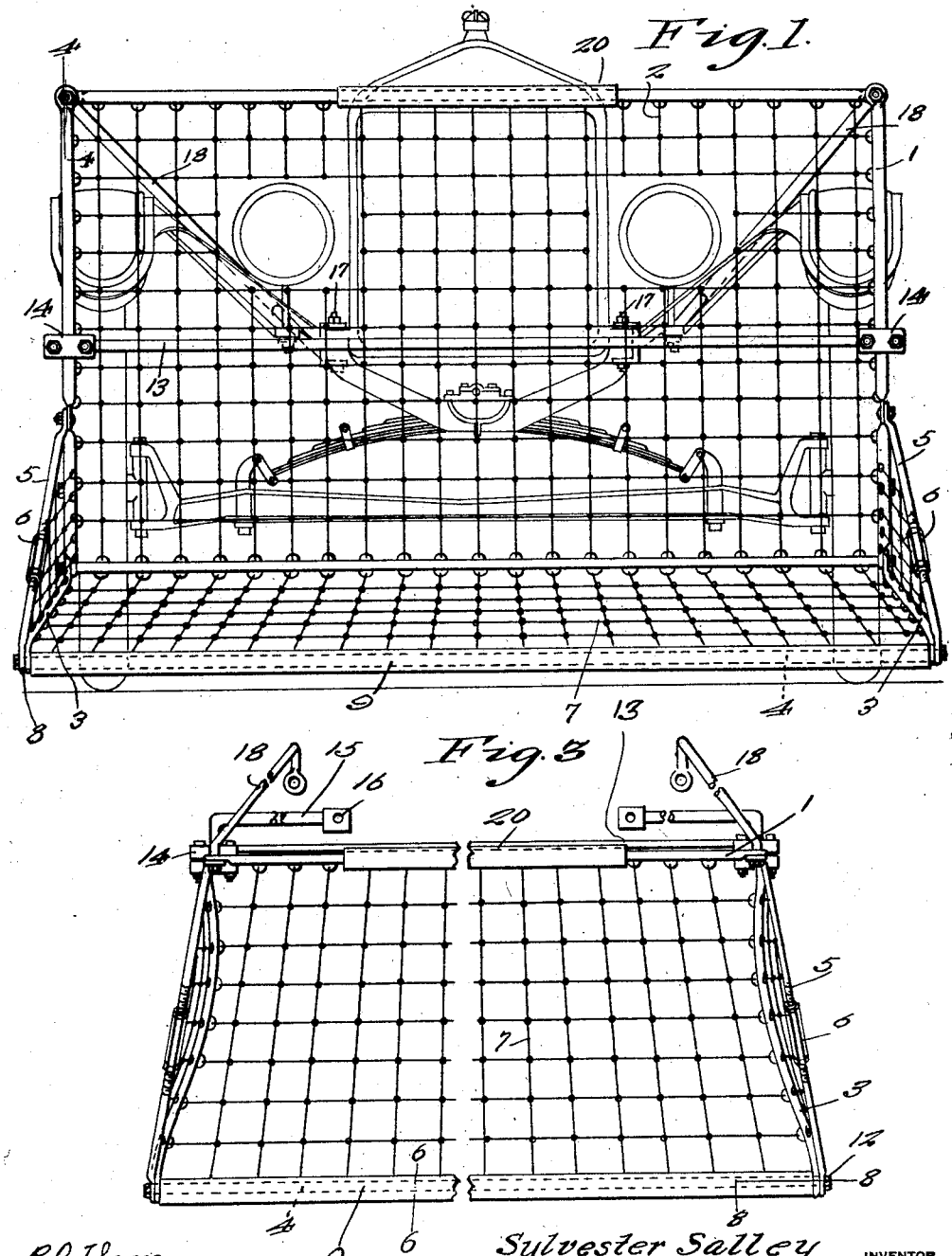

Mar. 3, 1925.
S. SALLEY
1,528,697
FENDER
Filed Oct. 1, 1924    2 Sheets-Sheet 2
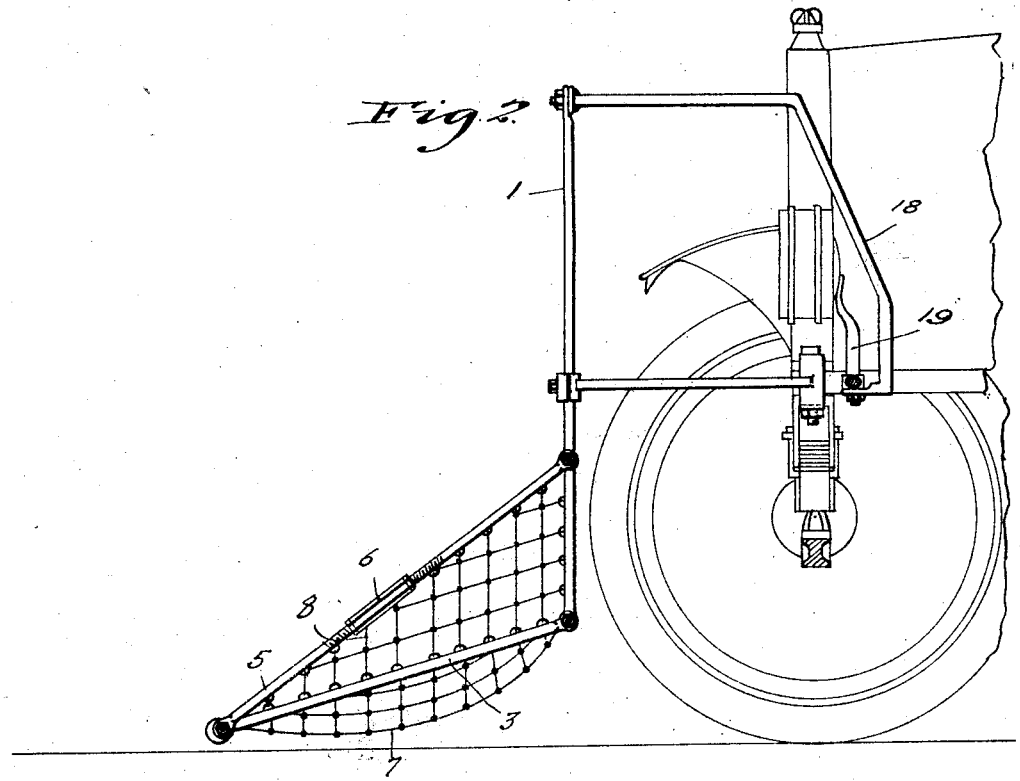
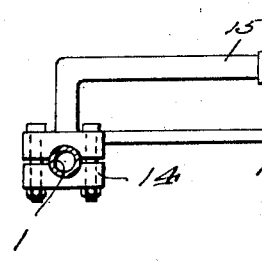
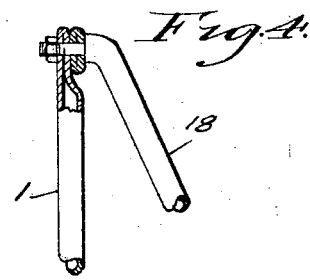
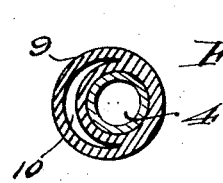
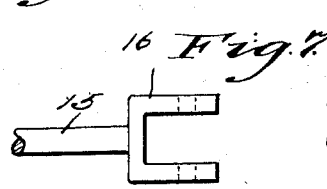
Sylvester Salley INVENTOR Patented Mar. 3, 1925.

1,528,697

UNITED STATES PATENT OFFICE.

SYLVESTER SALLEY, OF ROLAPP, UTAH.

FENDER.

Application filed October 1, 1924. Serial No. 741,001.

*To all whom it may concern:*

Be it known that I, SYLVESTER SALLEY, a citizen of the United States, residing at Rolapp, in the county of Carbon and State of Utah, have invented new and useful Improvements in Fenders, of which the following is a specification.

This invention relates to a fender for a motor vehicle, the general object of the invention being to provide a frame covered with wire mesh and having means thereon for connecting it to the front part of the motor vehicle and a forwardly extending frame connected with the lower end of the first frame and covered with wire netting and adjustable brace rods for connecting the outer end of the second frame with a portion of the first frame.

This invention also consists in certain other features of construction and in the combination and arrangement of the several parts, to be hereinafter fully described, illustrated in the accompanying drawings and specifically pointed out in the appended claim.

In describing my invention in detail, reference will be had to the accompanying drawings wherein like characters denote like or corresponding parts throughout the several views, and in which:—

Figure 1 is a front view of a vehicle showing my invention in position.

Figure 2 is a side view with parts in section.

Figure 3 is a bottom plan view of the invention.

Figure 4 is a section on line 4—4 of Figure 1.

Figure 5 is a view of one end of one of the supporting members.

Figure 6 is a section on line 6—6 of Figure 3.

Figure 7 is a view of the forked end of one of the supporting members.

Figure 8 is a section on line 8—8 of Figure 3.

In these views, 1 indicates a rectangular frame which is covered with wire netting 2 and which frame is preferably formed of tubing with the ends of the tubing flattened and perforated to receive the fastening means. Forwardly extending members 3 are fastened to the ends of the bottom piece of the frame 1 and the forward ends of these members 3 are connected together by the piece 4, the pieces 3 and 4 also being preferably formed of tubing. Brace members 5 connect the ends of the member 4 with the upright pieces of the frame 1 and each brace is formed of two sections which are connected together by the turnbuckle 6 so that the brace can be adjusted as to its length.

Wire netting 7 is placed in the space defined by the end pieces 3, the tubular member 4 and the bottom piece of the frame 1 and wire netting 8 is placed in the spaces formed at the ends of the device by the braces 5 and the end pieces 3 and portions of the frame 1.

A tube 9, preferably formed of rubber, is placed on the member 4 and said tube is formed with an air space 10 in its front portion, so that it will act as a bumper. The member 4 has threaded end parts 11 which pass through the flattened ends of the end pieces 8 and the braces 5 and receive nuts 12 for holding these parts together, as shown in Figure 8. The upper ends of the braces are bolted to the upright pieces of the frame 1 and the portions through which the bolts pass are flattened as shown.

A bar 13 is clamped to the upright pieces of the frame 1 by the clamping blocks 14 and the rear block of each pair carries a bent arm 15 which is provided with a forked outer end 16, the prongs of which are perforated to receive the bolts 17 which hold the radiator of the vehicle on its support, the forked portions straddling the ears on the radiator and the supports. Brace members 18 are fastened to the upper corners of the frame 1 and extend downwardly in rear of the head lamps and have their bent ends fastened to the lamp supports 19, as shown.

It will thus be seen that I have provided a simple form of fender which can be attached to a motor vehicle by the bolts already in the vehicle so that it is not necessary to change the parts of the vehicle in any way. A person struck by the fender will be caught by the lower depending part so that he cannot be run over by the vehicle. I may place a tube 20 of resilient material on the top rod of the frame 1 to prevent this rod from rubbing against the radiator. The bumper will take up shock of the device striking an object and this bumper can be adjusted in relation to the ground by means of the turn-buckles 6 so that the device can ride over obstructions on the ground and if desired the upper ends of the braces can be detached from the frame 1 so that the forward part of the fender can be swung upwardly against the rear part. It may be necessary to do this in traveling over rough roads and in placing the car in a garage which is provided with high sills. In other cases it is simply necessary to raise the forward end of the device by means of the turn buckles.

It is thought from the foregoing description that the advantages and novel features of my invention will be readily apparent.

I desire it to be understood that I may make changes in the construction and in the combination and arrangement of the several parts, provided that such changes fall within the scope of the appended claim.

What I claim is:—

A fender for a motor vehicle comprising a rectangular frame, a forwardly extended frame pivoted to the lower end of the first frame, adjustable brace members connecting the front end of the second frame with portions of the first frame, wire netting covering the frames, a bumper at the forward end of the second frame, means for connecting the first frame with the vehicle, such means consisting of a rod clamped to the upright members of the first frame, bent arms carried by the clamping means and having their free ends forked to engage the radiator supporting means of the vehicle and braces connected with the upper ends of the first frame and extending downwardly and engaging the lamp supporting means of the vehicle.

In testimony whereof I affix my signature.

SYLVESTER SALLEY.